M. W. DOYLE.
CONNECTING DEVICE.
APPLICATION FILED JAN. 6, 1919.
1,394,673.
Patented Oct. 25, 1921.
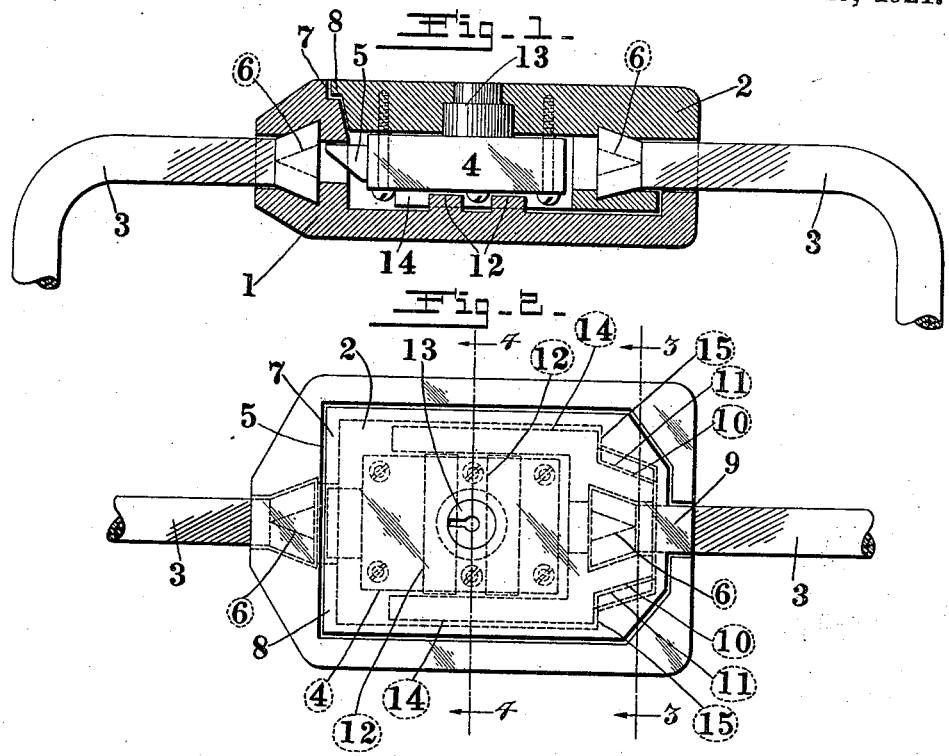
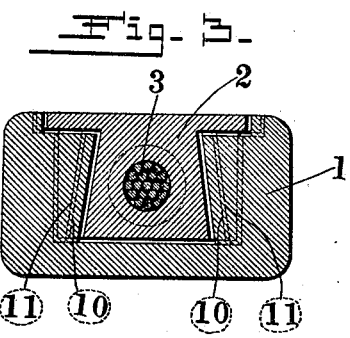
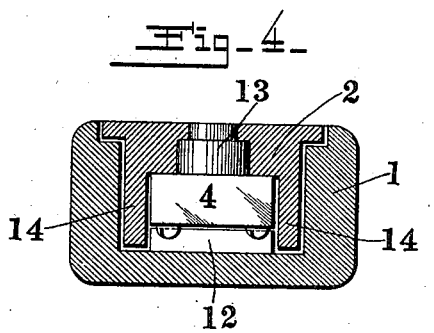
WITNESS.
Charles A. Becker.
INVENTOR.
Merrill W. Doyle
BY
E. E. Huffman
ATTORNEY.

UNITED STATES PATENT OFFICE.

MERRILL W. DOYLE, OF ST. LOUIS, MISSOURI.

CONNECTING DEVICE.

1,394,673. Specification of Letters Patent. Patented Oct. 25, 1921.

Application filed January 6, 1919. Serial No. 269,781.

*To all whom it may concern:*

Be it known that I, MERRILL W. DOYLE, a citizen of the United States of America, residing at the city of St. Louis, State of Missouri, United States of America, have invented a certain new and useful Connecting Device, of which the following is such a full, clear, and exact description as will enable any one skilled in the art to which it appertains to make and use the same, reference being had to the accompanying drawings, forming part of this specification.

My invention relates to a connecting device for locking two parts together such as the ends of a cable employed to lock a wheel of an automobile to the chassis or to lock spare tires to the machine, and one of the objects of the invention is to produce a device of this character in which tension on the connected parts merely results in more intimate union of the connecting members instead of tending to separate them. Another object is to so arrange the coöperating surfaces of the connecting members that tension on the connected parts does not impose any strain on the lock which prevents their separation and a still further object is to so protect this lock that its bolt cannot be reached by any tool and no point of application of a tool will exist by means of which any strain can be applied to the locking bolt.

In the accompanying drawings which illustrate one form of my invention, Figure 1 is a view partly in vertical longitudinal cross section and partly in elevation illustrating my connecting device with the parts in assembled relation; Fig. 2 is a top plan view of the same; Fig. 3 a vertical transverse cross section along the line 3—3 of Fig. 2; and Fig. 4 is a vertical transverse cross section along the line 4—4 of Fig. 2.

Apart from the lock, my connecting device comprises only two parts—a casting 1 provided with a socket or recess adapted to receive another casting 2. Part 1 is connected to one end of a cable 3 and part 2 to the other end of this cable which is preferably a woven wire cable locked to the parts 1 and 2 by means of spreading wedges 6 as shown. Part 1 is provided with a recess 7 of greater cross sectional area than the main recess or socket for the reception of the part 2 and said part 2 carries a flange 8 adapted to seat in said recess. The flange and recess extend entirely around the parts except at the point where the cable is attached to part 2. Here part 2 is provided with an extension 9 adapted to fit in the corresponding opening in the part 1. The end of part 2 to which the cable is attached has inclined locking surfaces as shown in Figs. 2 and 3. These locking surfaces converge vertically and diverge in the direction from the rear end of part 2 to which the cable is attached toward the front end of this part. The part 1 is provided with surfaces inclined to coöperate with the surfaces of part 2 just described. In Fig. 2 dotted lines 10 indicate the rear vertical edges of the locking surfaces of part 2 and the dotted lines 11 the rear edges of the coöperating locking surfaces of the part 1. It will be observed that what may be termed the beveled dove tail construction just described locks the rear end of part 2 to the front end of part 1, that is to say, prevents separation of these parts at right angles to the direction of their length, and also cause part 1 to be drawn into more intimate contact with part 2 when tension is applied tending to separate the ends of the cable, the lower surface of part 2 being pulled down toward the bottom of the recess in part 1. When the parts are in complete engagement or at least when under tension the flanges 14 on part 2 bear on shoulders 15 of part 1.

Lock 4 is attached to the lower surface of the part 2 and its spring bolt 5 is adapted to coöperate with the wall of a flange or recess in the part 1 as shown. The ridges 12 on the part 1 in the bottom of the recess form an abutment which prevents driving the key way and the lock down to gain access to the bolt 5 and the coöperating recess 7 and flange 8 make it impossible to insert a tool between the parts in such position as to apply any strain on the bolt 5. It will, therefore, be noted that by the provisions described, I have eliminated the possibility of unauthorized separation of the connecting parts without actually destroying them, and further that no strain can be placed on the bolt 5 by any manipulation or tension on the cables.

The parts 1 and 2 can be separated by withdrawing the bolt 5 by means of a key and then lifting the front end of the part 2 until the lower portion of the lock clears the upper edge of the rear end of part 1. Part 2 can then be drawn backward to disengage the coöperating locking surfaces 10 and 11.

Having fully described my invention, what I claim as new and desire to secure by Letters Patent of the United States is:

1. A connecting device comprising two members each attached to one of the parts to be connected, one of said members being provided with a lateral socket for the reception of the other member opening transversely to the line of tension between the connected parts, said members having correspondingly inclined coöperating locking surfaces.

2. A connecting device comprising two members each attached to one of the parts to be connected, one of said members being provided with a lateral socket for the reception of the other member opening transversely to the line of tension between the connected parts, said members having coöperating locking surfaces at one end, and key operated means at the other end for preventing disengagement of said surfaces.

3. A connecting device comprising two members each attached to one of the parts to be connected, one of said members being provided with a lateral socket for the reception of the other member opening transversely to the line of tension between the connected parts, and means for locking said members together at both ends.

4. A connecting device comprising two members each attached to one of the parts to be connected, one of said members being provided with a socket for the reception of the other member, coöperating locking surfaces on said members preventing separation of said members except by relative motion bringing the connected parts toward each other, and means for preventing such relative motion.

5. A connecting device comprising two members each attached to one of the parts to be connected, one of said members having a socket for the reception of the other member and an opening through the wall of said socket member and communicating with said socket, said second member having a reduced portion to which one of the parts to be connected is attached, said reduced portion being adapted to fit in the opening in the wall of the other member, coöperating locking surfaces preventing the removal of said reduced portion from the said opening except by relative longitudinal movement and locking means preventing said longitudinal movement.

6. A connecting device comprising two members each having one end attached to one of the parts to be connected, one of said members having a lateral socket into which the other member is adapted to be inserted and a lateral opening communicating with said socket to receive the part attached to the inserted connecting member, said socket being adapted to prevent longitudinal movement of the other member in either direction, and said members being provided with coöperating locking surfaces at one end to prevent separation of said ends by relative lateral movement, and locking means preventing relative lateral movement of the other ends of said members.

7. A connecting device comprising two members each having one end attached to one of the parts to be connected, one of said members forming a socket for the reception of the other member and provided with an opening for the passage of the part connected to the last named member, the walls of said socket being provided with a circumferential recess and the other member having a circumferential flange adapted to seat in said recess and form a flush joint with the upper surface of the first named member, a locking bolt carried by one of said members and coöperating with a locking flange on the other, said locking bolt and flange being within the socket and below the circumferential recess when the connecting members are in assembled relation.

In testimony whereof, I have hereunto set my hand and affixed my seal.

MERRILL W. DOYLE. [L. S.]